United States Patent [19]

Schwartz et al.

[11] 4,052,306
[45] Oct. 4, 1977

[54] OIL SWEEP

[75] Inventors: Michael G. Schwartz, St. Paul; Alan P. Lorentzen, White Bear Township, Ramsey County; David J. Bucheck, N. St. Paul, all of Minn.

[73] Assignee: Minnesota Mining and Manufacturing Company, St. Paul, Minn.

[21] Appl. No.: 731,464

[22] Filed: Oct. 12, 1976

[51] Int. Cl.² .............................................. E02B 15/04
[52] U.S. Cl. ......................... 210/242 S; 210/DIG. 5; 210/DIG. 26; 210/314
[58] Field of Search ....... 210/242, DIG. 25, DIG. 26, 210/83, DIG. 5, 314; 61/1 F

[56] References Cited

U.S. PATENT DOCUMENTS

| 3,537,587 | 11/1970 | Kain | 210/DIG. 26 |
|---|---|---|---|
| 3,584,462 | 6/1971 | Gedd | 61/1 |
| 3,667,235 | 6/1972 | Preus | 61/1 |
| 3,667,608 | 6/1972 | Burroughs et al. | 210/DIG. 26 |
| 3,679,058 | 7/1972 | Smith | 210/DIG. 26 |
| 3,702,657 | 11/1972 | Cunningham et al. | 210/DIG. 26 |
| 3,710,943 | 1/1973 | Davidson | 210/242 |
| 3,779,382 | 12/1973 | Stelnher | 210/DIG. 26 |
| 3,783,621 | 1/1974 | Preus | 61/1 |
| 3,810,832 | 5/1974 | Rhodes | 210/DIG. 26 |
| 3,831,756 | 8/1974 | Bhuta et al. | 210/DIG. 25 |

FOREIGN PATENT DOCUMENTS

| 958,230 | 11/1974 | Canada | 210/DIG. 25 |
|---|---|---|---|
| 1,525,310 | 9/1968 | France | 210/DIG. 25 |

Primary Examiner—Theodore A. Granger
Attorney, Agent, or Firm—Cruzan Alexander; Donald M. Sell; Roger R. Tamte

[57] ABSTRACT

A floatable oil sweep useful in controlling an oil spill on a moving body of water comprises an elongated web of oil sorbent adapted to float on the body of water with its large-area faces parallel to the waterline, and a weighted open-mesh netting attached to the web and adapted to be suspended below the floating web when the oil sweep is deployed. Use of the netting has been found to significantly extend the period of time before oil droplets are carried under the oil sweep by movement of the body of water.

7 Claims, 5 Drawing Figures

OIL SWEEP

BACKGROUND OF THE INVENTION

Oil spills on bodies of water subject to a significant current, e.g. rivers, port areas subject to tide flows, etc., are a continuing problem in pollution control, resisting measures that have proven useful on more still bodies of water. For example, deployment of floatable oil sweeps conveniently and adequately contains and sorbs oil spilled on most still bodies of water, but the current in a moving body of water strips oil from the slick that accumulates in front of a floatable sweep and carries the oil under the sweep.

One approach taken by the art in confronting this problem has been to increase the complexity of barriers intended to contain a spill. For example, an article in *Chemical Engineering* for May 10, 1976, "Oil-Spill Control Nears for Two Pesky Problems," page 76 et seq., describes an illustrative containment boom that consists of rigid rectangular modules having a perforated plate mounted at an angle to the waterline. Oil floating on the surface of the water preferentially passes through the perforations in the plate and into a rectangular basin inside the module, while most of the underlying water is diverted downward. Within the basin, the velocity of the oil/water stream substantially drops to create a quiescent zone, whereupon a thick oil film develops that is then picked up by a pump.

Booms of such complexity are not an adequate answer to the problem. The barriers are expensive to purchase, and they are time-consuming and inconvenient to deploy and recover. Since the barriers are generally intended to be used as a precautionary measure, e.g., they are deployed each time a different ship prepares to transfer oil and then withdrawn after the transfer is completed, the total amount of time and effort spent in handling them becomes very large over the period of their use.

Until less time-consuming and inconvenient approaches are found, there will be a continuing desire within the art for different products and methods.

SUMMARY OF THE INVENTION

The present invention lays the basis for a different approach to the problem of oil spills on moving water, by providing a new floatable oil sweep adapted to be conveniently stored in a small space but rapidly deployable in case an oil spill occurs. This new oil sweep prevents carryunder of oil in a moving body of water much longer than conventional floatable oil sweeps and can serve as at least a temporary barrier for an oil spill while other efforts are made to remove or handle the spill.

Briefly, an oil sweep of the invention comprises an elongated web of oil sorbent adapted to float on a body of water with its large-area faces parallel to the waterline; an open-mesh netting disposed over at least a portion of one large-area face of the oil sorbent and attached to the web at transversely spaced, longitudinally extending locations on the web; and a weight attached to the netting at a point intermediate the edges of the web. The dimensions of the netting and the location of the points of attachment of the netting to the web are such that when the web is horizontal and the weight hangs freely below the web, the weight is spaced from the web a distance equal to at least 15 percent of the transverse width of the web.

The full explanation for the improved containment exhibited by an oil sweep of the invention is not understood, but it is attributed to a modification in the flow of water under the oil sorbent caused by the suspended netting. Some oil shearing from the oil slick accumulating in front of the sweep and carried by the flow of water under the oil sorbent is undoubtedly physically engaged by the netting and then intercepted or deflected to the oil sorbent; but not all of the sheared droplets of oil would be so intercepted. Apparently oil droplets that pass within the meshes of the netting enter into a more quiescent area defined by the suspended netting, where, because they are lighter than water, they rise to the oil sorbent and are sorbed.

Netting has been used in many prior-art oil sweeps, but never in the way it is included in an oil sweep of the invention. For example, netting has been previously used as a wrapping for segments of oil sorbent to hold the sorbent together (see Smith, U.S. Pat. No. 3,679,058 or Bogosian, U.S. Pat. No. 3,739,913); but the netting is not arranged and weighted so as to be suspended below the oil sorbent. A different construction taught in Preus, U.S. Pat. Nos. 3,667,235; 3,783,621; or 3,795,315, includes netting attached to an inflated float and weighted so as to hang from the float; the netting is intended to catch oil that has been previously thickened with a particulate solid oil sorbent. The netting in this construction is not suspended below an oil sorbent so as to modify a flow of oil-entraining water and cause the entrained oil to be directed to the oil sorbent. In a variation, taught in U.S. Pat. No. 3,667,235, a blanket of oil sorbent is added to the barrier; but this blanket is also suspended from the float, and because it is impermeable, the blanket tends to direct the current flow further down beneath the barrier and thereby reduces any influence of the netting to establish a quiescent space for oil to separate from the water and rise to the sorbent.

Other prior-art barriers using netting in ways even more remote from its use in oil sweeps of the invention are taught in Davidson, U.S. Pat. No. 3,710,943; Fitzgerald, U.S. Pat. No. 3,590,584; and Gadd, U.S. Pat. No. 3,584,462.

DETAILED DESCRIPTION

Figure 1:
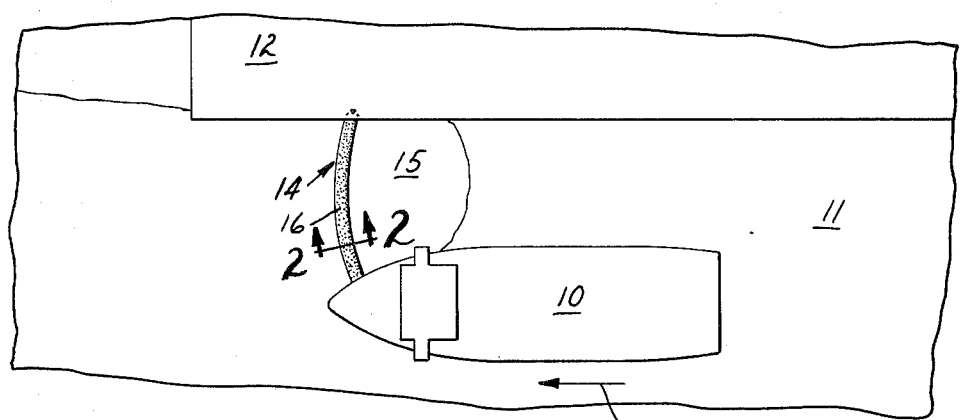
FIG. 1 is a schematic diagram of a representative deployment of an oil sweep of the invention between a ship and a dock at the edge of a moving body of water.

As shown in FIG. 1 a typical use for an oil sweep of the invention occurs when a ship 10 is at rest in a stream 11 unloading oil to a dock 12. During such unloading operations an oil spill may accidentally occur. To prevent movement of the spilled oil downstream (in the direction of the arrow 13), an oil sweep of the invention 14 may be rapidly deployed downstream from the spilled oil either from the dock 12 or the ship 10. The oil sweep will typically be stored in a roll either on the dock or on the ship, with a rope or handle attached to the leading edge of the sweep. When a spill occurs, the leading edge of the sweep is grasped and rapidly pulled between the ship and dock, where it floats on the surface of the water and temporarily contains the spill 15. The sweep may also be easily deployed as a preventative measure, if that is desired.

Figure 2:
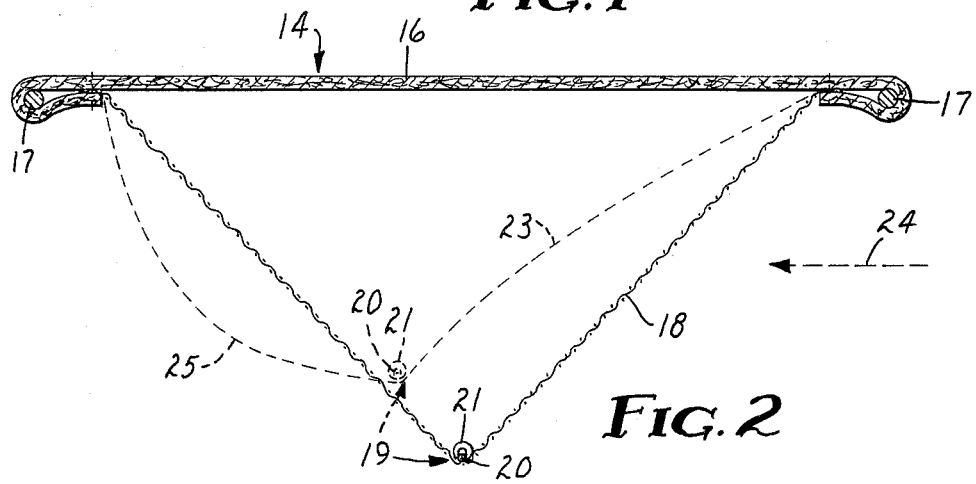
FIG. 2 is a sectional view taken along the lines 2—2 of the oil sweep shown in FIG. 1.
Figure 3:
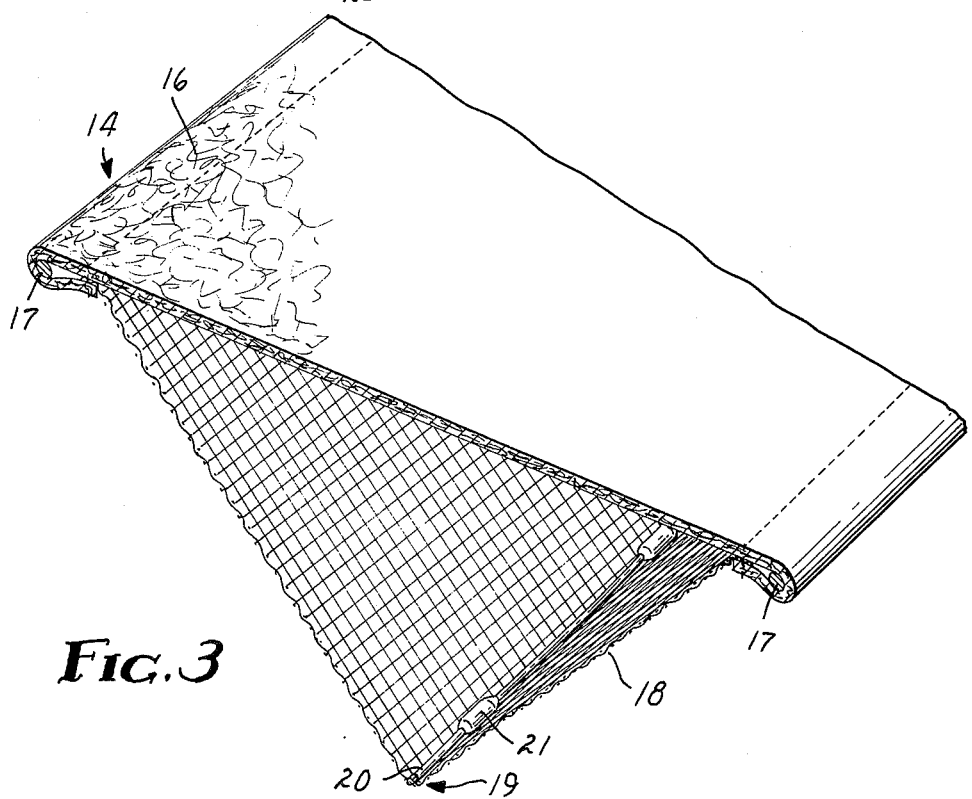
FIG. 3 is a perspective view of the oil sweep shown in FIG. 1.
Figure 4:
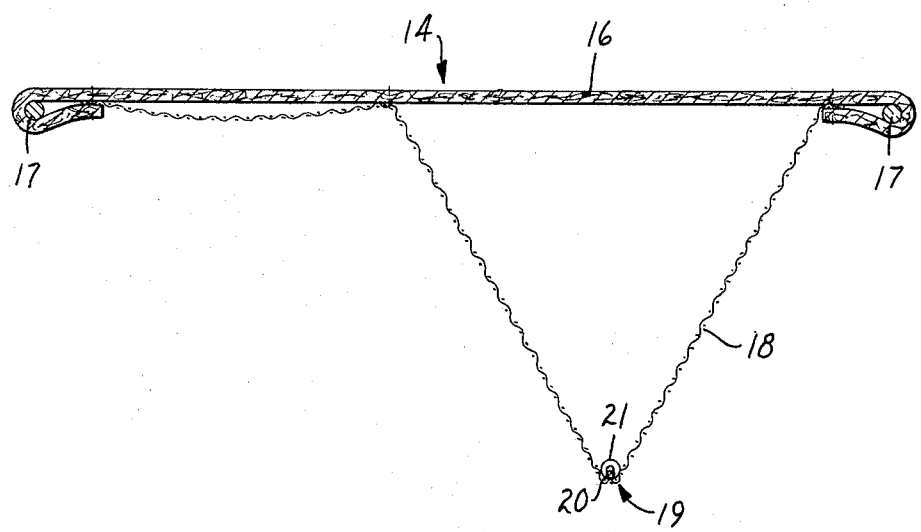
FIGS. 4 and 5 are cross-sectional view of different sweeps of the invention.
Figure 5:
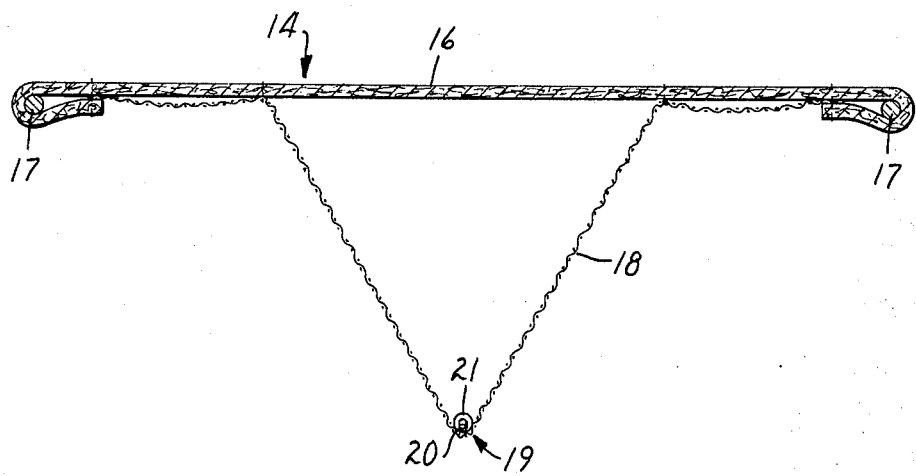

As shown in FIGS. 2 and 3 the illustrative oil sweep 14 pictured in FIG. 1 comprises a web 16 of buoyant oil sorbent reinforced by ropes 17 around which the edges of the oil sorbent are folded and sewn; a netting 18 attached at its edges to the edges of the web of oil sorbent; and a weight 19, in the form of a cord 20 on which a plurality of sinkers 21 are clamped, attached along a central logitudinal axis of the netting. The web 16 of oil sorbent generally comprises a buoyant high-void-volume, porous material in which the pores at least approach capillary size such that they sorb into themselves significant amounts of the dispersed liquid, typically oil. Generally an oil sorbent used in a sweep of the invention will sorb a weight at least equal to its own weight and preferably equal to five or ten times its own weight.

A web of microfibers is a particularly preferred sorbent, with the microfibers generally averaging less than about 20 micrometers and preferably less than about 10 micrometers in diameter, and being formed from a polymer such as polyolefin, polystyrene, polyester, or polyamide. Polymers based on olefins (that is, in which olefins account for a major portion of the monomer constituents), particularly ethylene and propylene, and styrene are especially preferred. Microfiber webs are generally formed by blowing techniques such as described in Wente, Van A., "Super Fine Thermoplastic Fibers," *Industrial Engineering Chemistry*, 342, Volume 48, page 1342 et seq. (1956), as well as such patents as Francis, U.S. Pat. No. 2,464,301; Ladisch, U.S. Pat. No. 2,612,679; and Till et al, U.S. Pat. No. 3,073,735. In these processes a liquified, normally solid polymeric material is extruded through an orifice into a high-velocity gaseous stream that draws out and attenuates the extruded material into very fine fibers, which solidify during travel in the gaseous stream to a collector.

Other sorbents also provide quite useful results. One example is a web formed from preformed synthetic or naturally occurring fibers, e.g. a nonwoven web prepared on a carding or garneting machine. Other useful sorbents for use in sweeps of the invention include open-celled foams, beds of sorbing particulate matter contained in a porous envelope, and porous or so-called imbibing solids such as small spheres of lightly-cross-linked polymers such as polystyrene which have fine capillaries that sorb and hold a liquid.

The oil sorbent is adapted to float in water with its large-area faces parallel to the waterline, either because of the buoyancy of the sorbing media itself or by addition of other buoyant structure to the sorbing media. Examples of additional buoyant structure are closed-cell foams or polystyrene floats. The floats can take the form of elongated tubes or ropes, which are attached along the length of a web of oil sorbent.

The open-mesh netting attached to the oil sorbent generally is formed from a network of filaments. These filaments may be woven, knitted, or otherwise assembled, and may be fused together at their cross points. Alternatively, the netting may be formed from a single piece of material, as when a sheet of plastic is perforated and then expanded to enlarge the perforations. The term "netting" is used herein to include sheet materials prepared by perforating a film or other sheet material, even though the perforations may occupy a limited portion of the area of the sheet, such as about 30 or 50 percent. For the best results the openings in the netting are rather small, such as less than one centimeter, and preferably about 0.5 centimeter or smaller, in their smallest dimension.

In some embodiments, the netting is wrapped around the whole oil sorbent and forms a "tube" or closed cylinder. Such a tubular or cylindrical construction is a convenient way of retaining the netting on the oil sorbent, although the netting is also preferably sewn or stitched to the oil sorbent. However, in most cases, only sufficient netting is included to cover one face, or a portion of one face, of the oil sorbent as shown in FIGS. 2-5.

Whatever the method of attachment, the netting has a sufficient extent between the points of attachment such that when the sweep floats in water the netting will hang down beneath the oil sorbent. Weights are attached to the netting to assure such suspension, and the dimensions of the netting are such as to allow it to be suspended below the oil sorbent a significant distance. To achieve the longest prevention of oil carryunder when an oil sweep of the invention is deployed, the weighted portion of the netting should be capable of being suspended beneath the oil sorbent a distance equal to at least 15 percent of the width of the oil sorbent (this distance being measured when the netting is hanging freely, as in a still body of water or outside the water), and preferably at least 20 percent of the width of the oil sorbent. Also the longest prevention of carryunder occurs with wider webs of oil sorbent, so long as the oil sorbent will float in a generally flat condition with its large-area faces parallel to the waterline. For best results the web of oil sorbent is at least 20 inches (50 centimeters) wide and preferably at least 30 inches (75 centimeters) wide.

The flow of water typically moves the netting underneath the web of oil sorbent, as indicated by dotted lines in FIG. 2. As shown there, the leading section 23 of the netting 18 (i.e., a section which extends between the web 16 of oil sorbent and the weight 19 and faces the direction of current flow as indicated by arrow 24) is caused to curve toward the trailing section 25 of netting and upwardly toward the web. The trailing section 25 or netting generally curves somewhat less, and the weight is lifted somewhat. While this movement reduces the distance that the netting is suspended below the web of oil sorbent, the amount of reduction is typically not sufficient to significantly reduce the prevention of carryunder. To assure proper drape of the netting in a current, additional weight can be added to the netting, and, if necessary, additional buoyant structure can be added to the oil sorbent to counterbalance the weight added to the netting. Other structure may also be added to the described basic structure of a sweep of the invention; e.g. a second layer of netting may be suspended from the web of oil sorbent and lie between the web and the previously described netting; however, any such structure should not significantly deflect the current in the water below the netting.

One practical method for attaching weight to the netting is by attaching small weights to a cord, as by clamping a sinker of lead onto the cord, and then sewing or clipping the cord to the netting. Alternatively, sinkers are clamped directly to the netting, or the weight takes the form of a lightweight metal cable or chain running the length of the sweep or portions of the length and attached to the netting.

The invention will be further illustrated by the following example. A 36 inch-wide (92 centimeters), ⅜ inch-thick (1 centimeter), 12 ounce-per-yard (0.4 kilogram/square meter) web of polypropylene microfibers that averaged 10 micrometers in diameter was reinforced at each edge by folding and sewing each of the edges around a ⅜ inch-diameter (1 centimeter) rope. The resulting web was 32 inches (82 centimeters) wide.

Lead sinkers, each weighing 3 ounces (85 grams), were clamped onto a ⅛ inch-diameter (0.3 centimeter) cord at a spacing of 16 inches (40 centimeters) and the cord then clipped along the center of a length of 34 inch-wide (86 centimeters) netting having 3/16 inch-square (0.48 centimeter) meshes. The edges of the netting were then sewn to the edges of the reinforced oil sorbent web (alternatively the netting could be inserted into the fold of the oil sorbent around the reinforcing ropes and sewn to the oil sorbent when the folded over edges of oil sorbent are sewn, as shown in the drawings). The netting was a width such that the weighted center portion of the netting hangs down 7 inches (18 centimeters) below the web in a quiescent situation. The resulting oil sweep was then wound into a roll, with a 200 foot (60 meters) length of the sweep forming a 37 inch diameter (94 centimeters) roll.

A segment of the described sweep was tested in a circular test tank having an outside diameter of 15.2 feet (4.6 meters) and an inside diameter of 6.5 feet (2 meters), forming a circular channel 4.35 feet (1.3 meters) wide. Water 12 inches (30 centimeters) deep was circulated in the pool by sump pumps to provide a current flow of 0.8 feet (0.25 meter) per second. The described sweep was deployed across the channel and then oil was dropped onto the surface of the water at a point 22 feet (6.7 meters) around the channel from the sweep by a "Masterflex" peristaltic pump at a rate of 15 milliliters per minute. The amount of oil charged onto the surface of the water was measured and related to two different kinds of performance by the oil sweep: occasional sightings of oil (1080 milliliters charged); and continual flow of oil droplets under the sweep (1700 milliliters charged). By comparison, when a web of the described oil sorbent 22 inches (56 centimeters) wide and without netting is tested in this manner, occasional sightings are noted after 40 milliliters are charged onto the surface of the water; and continual flow of oil droplets occurs after 125 milliliters are charged. Essentially similar results occur with a 36 inch-wide (0.92 meter) web of oil sorbent.

What is claimed is:

1. A floatable oil sweep useful in controlling oil spills on moving bodies of water comprising an elongated web of oil sorbent adapted to float on a body of water with its large-area faces parallel to the waterline, said web being reinforced along its edges with ropes that extend along the length of the web; an open-mesh netting disposed over one large-area face of the oil sorbent, with first and second longitudinal edges of the netting attached to corresponding first and second edges of the web; and weight means attached to the netting at points intermediate the edges of the web and extending along the length of the sweep such that when the web is horizontal a chamber enclosed by the netting is formed below the lower face of the web, with the weight means hanging freely below the web a distance equal to at least 15 percent of the transverse width of the web; said oil sweep being windable into a compact storage roll in which the web is wound in tightly overlaid convolutions with netting sandwiched between the convolutions.

2. A sweep of claim 1 in which the web of oil sorbent comprises a web of entangled oleophilic fibers which are hydrophobic in the presence of oil.

3. A sweep of claim 2 in which said fibers comprise synthetic polymeric microfibers.

4. A sweep of claim 1 in which the oil sorbent has a transverse width of at least 30 inches.

5. A sweep of claim 1 in which the netting comprises synthetic polymeric filaments.

6. A floatable oil sweep useful in controlling oil spills on moving bodies of water comprising an elongated web of synthetic polymeric oleophilic microfibers which are hydrophobic in the presence of oil, said web being reinforced at its edges with ropes that extend along the length of the web; having a width of at least 30 inches; and being adapted to float on the body of water with its large-area faces parallel to the waterline; an open-mesh netting disposed over at least a portion of one large-area face of the oil sorbent, with first and second longitudinal edges of the netting being connected to corresponding first and second edges of the web; and weight means attached to the netting at a point intermediate the edges of the web and extending along the length of the sweep such that when the web is horizontal a chamber enclosed by the netting is formed below the lower face of the web, with the weight means hanging freely below the web a distance equal to at least 20 percent of the transverse width of the web.

7. A sweep of claim 6 in which the smallest dimension of an average opening in the netting is less than about one centimeter.

* * * * *